US011402222B2

(12) United States Patent
Lear et al.

(10) Patent No.: US 11,402,222 B2
(45) Date of Patent: Aug. 2, 2022

(54) ROUTE DETERMINATION BASED ON FUEL STOPS AND WAYPOINTS THAT ARE PART OF ROUTE RESTRICTIONS

(71) Applicant: Verizon Patent and Licensing Inc., Arlington, VA (US)

(72) Inventors: Peter J. Lear, Scarborough (CA); Suet Fun M. Tsang, Markham (CA); Changxiu Li, Markham (CA); Elizabeth A. Burgess, Toronto (CA); Victor J. Rehorst, Whitby (CA)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 275 days.

(21) Appl. No.: 16/284,779

(22) Filed: Feb. 25, 2019

(65) Prior Publication Data

US 2020/0271463 A1    Aug. 27, 2020

(51) Int. Cl.
*G01C 21/34* (2006.01)
*G01C 21/20* (2006.01)
*G01C 21/36* (2006.01)

(52) U.S. Cl.
CPC ......... *G01C 21/3415* (2013.01); *G01C 21/20* (2013.01); *G01C 21/343* (2013.01); *G01C 21/3691* (2013.01)

(58) Field of Classification Search
CPC ............... G01C 21/3415; G01C 21/20; G01C 21/3691; G01C 21/343; G01C 21/3469; G01C 21/3492
See application file for complete search history.

(56) References Cited

U.S. PATENT DOCUMENTS

| 2009/0234577 | A1* | 9/2009 | Rinscheid | G01C 21/3415 |
| | | | | 701/533 |
| 2015/0106001 | A1* | 4/2015 | Lee | G01C 21/36 |
| | | | | 701/123 |
| 2016/0155086 | A1* | 6/2016 | Fuller | G01C 21/3629 |
| | | | | 705/333 |
| 2018/0350366 | A1* | 12/2018 | Park | G10L 15/30 |
| 2019/0178660 | A1* | 6/2019 | Greenberg | G01C 21/3691 |
| 2020/0173800 | A1* | 6/2020 | Dudar | G05D 1/0217 |
| 2020/0182635 | A1* | 6/2020 | Zender | G06F 16/29 |

\* cited by examiner

*Primary Examiner* — Rami Khatib
*Assistant Examiner* — Gabriel J Lambert

(57) ABSTRACT

A device receives, from another device, a request for navigational instructions for a vehicle. That request includes data that identifies stops for the vehicle. The device receives route restriction data that identifies route restrictions that include a set of waypoints. The device selects, by analyzing the route restriction data, particular waypoints to include in the stops. The device determines an initial route through the stops that include the particular waypoints. The device obtains fuel selection data to use to identify fuel stops. The device identifies a subset of the fuel stops that are near the initial route. The device selects a fuel stop, to include in the stops, based on at least one of: fuel data, fuel cost data, weather data, or traffic data. The device determines a final route that includes the stops, and provides, to the other device, the final route to permit the vehicle to be navigated.

20 Claims, 12 Drawing Sheets

ROUTE DETERMINATION BASED ON FUEL STOPS AND WAYPOINTS THAT ARE PART OF ROUTE RESTRICTIONS

BACKGROUND

A shipping organization can deploy a fleet of vehicles to perform deliveries. For example, a vehicle can be provided with a route that includes a set of stops that are to be made by the vehicle when delivering cargo.

DETAILED DESCRIPTION OF PREFERRED EMBODIMENTS

Figure 1A:
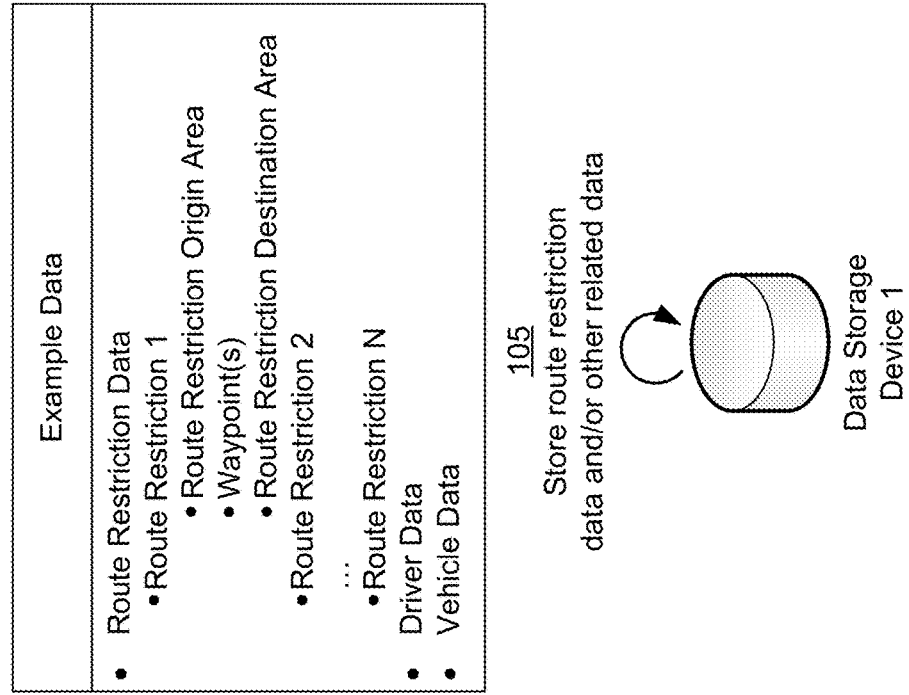
FIGS. 1A-1H are diagrams of one or more example implementations described herein.

The following detailed description of example implementations refers to the accompanying drawings. The same reference numbers in different drawings can identify the same or similar elements.

A navigation service can provide a user device or a vehicle with a set of navigational instructions for a route that includes a set of stops for a set of deliveries. In some situations, the route can be subject to a route restriction that requires the route to pass through one or more waypoints (e.g., a geographic location or area, as defined further herein). In this case, the navigation service can generate the route in a manner that is compliant with the route restrictions.

In other situations, the navigation service might be instructed to generate a route that includes one or more fuel stops that allow the vehicle to re-fuel while performing the set of deliveries. In this case, the navigation service can interact with a fuel planning service (e.g., a third-party fuel planning service) to identify fuel stops along the route.

However, if the navigation service receives instructions to generate a route that is subject to a route restriction and that also includes one or more fuel stops, the navigation service might generate a route that fails to comply with the route restriction or might generate a route that complies with the route restriction at the expense of taking an inefficient path to the destination location. For example, the navigation service can provide data identifying an initial set of stops for a vehicle to the fuel planning service, and the fuel planning service, due to not having access to data identifying the route restriction, would identify one or more fuel stops that could prevent the route from complying with the route restriction, would generate a route through the one or more fuel stops that might not be in compliance with the route restriction, and would provide data identifying the one or more fuel stops and/or navigational instructions for the route to the navigation service.

This wastes processing resources of the navigation service that were used to send data to the fuel planning service (only to receive data identifying sub-optimal fuel stops and/or an inefficient route), wastes processing resources of the fuel planning service that were used to identify sub-optimal fuel stops and/or to generate an inefficient route, wastes processing resources of the fuel planning service that were used to provide the navigation service with the data identifying the sub-optimal fuel stops and/or the navigational instructions for the inefficient route, wastes network resources of one or more network devices that allowed the navigation service to interact with the fuel planning service, and/or the like. If a sub-optimal route is provided to an end user, fuel resources of the vehicle will be wasted by causing the vehicle to travel using an inefficient path, processing resources of devices operated by a shipping organization can be wasted to investigate a reason why the route restriction was violated, and/or the like. If the navigation service recalculates a route that complies with the route restriction, the navigation service wastes computing resources to recalculate the route, wastes network resources of network devices that assist in providing the recalculated route to an end user, and/or the like.

Some implementations described herein describe a route management platform that can provide a user device with a route that is to be taken by a vehicle, where the route includes one or more waypoints (e.g., so as to comply with a route restriction) and one or more fuel stops. For example, a user device can provide, to the route management platform, a request for a set of navigational instructions. The request can include stops data that identifies a set of stops that are to be made by the vehicle and fuel request data that indicates to add one or more fuel stops to the set of stops. In this case, the route management platform can obtain route restrictions data that identifies route restrictions that are to be considered when generating the set of navigational instructions. The route restrictions can include one or more sets of waypoints that certain vehicles are required to travel through.

Additionally, the route management platform can, based on information included in the request and the route restrictions data, determine that a route restriction, of a set of route restrictions, is to be considered when generating the set of navigational instructions. In this case, the route management platform can update the stops data that identifies the set of stops to include, as new stops, a set of waypoints that are part of the route restriction. Furthermore, the route management platform can determine an initial route through the set of stops (e.g., which includes the set of waypoints).

Moreover, the route management platform can obtain fuel selection data that is capable of being used to identify a set of fuel stops. In this case, the route management platform can identify a subset of fuel stops that are within a threshold distance of the initial route and can select one or more fuel stops, of the subset of fuel stops, to include in the set of stops. The one or more fuel stops can be selected based on fuel data that identifies an amount of available fuel within the vehicle, fuel cost data that identifies a cost of fuel at the subset of fuel stops, the fuel selection data (e.g., which identifies how far each fuel stop is from a closest point of the initial route), traffic data for traffic within a threshold distance of the subset of fuel stops, weather information for weather near the subset of fuel stops, and/or the like.

Additionally, the route management platform can determine the set of navigational instructions for a final route that includes the set of stops, where the set of stops include the set of waypoints and the one or more fuel stops. Moreover, the route management platform can remove the set of waypoints from the set of stops of the final route (such that a user can view the final route without seeing the set of waypoints listed as stops) and can provide the set of navigational instructions of the final route to be displayed via an interface of the user device.

In this way, the route management platform generates and provides the user device with an optimal route that is compliant with the route restriction and that includes one or more fuel stops. By using the process described herein to generate and provide the user device with the optimal route, the route management platform conserves resources (e.g., processing resources, network resources, memory resources, and/or the like) that would otherwise be used to generate and provide the user device with an inefficient route (e.g., by using a fuel planning service that is unable to consider route restrictions when selecting fuel stops, by using a fuel planning service that is unable to effectively consider route restrictions when selecting fuel stops, etc.). For example, the route management platform conserves resources that would otherwise be used to generate the inefficient route, network resources that would otherwise be used to provide the user device with the inefficient route, resources of the user device that would otherwise be used to display the inefficient route, and/or the like. As a specific example, without utilizing the process described herein, a fuel planning service might select fuel stops that are far from waypoints included in a route restriction, which might cause an inferior navigation service to generate an inefficient route that passes through the waypoints and the fuel stops that are far from the waypoints.

Additionally, resources would be wasted generating and providing a user device with a second route after the inefficient route was generated (e.g., resources of the inferior navigation service needed to generate the second route, network resources of network devices used to provide the user device with the second route, resources of the user device used to receive the second route, and/or the like). Moreover, fuel resources of the vehicle would be wasted when the vehicle traveled through the inefficient route. In some cases, the inferior navigation service might generate a route that fails to comply with the waypoints (rather than generate an inefficient route that complies with the waypoints), which might cause one or more devices associated with a shipping organization to waste resources (e.g., processing resources, network resources, and/or the like) submitting complaints to the inferior navigation service, waste resources investigating why the route did not comply with the route restriction, and/or the like.

Furthermore, several different stages of the process described herein are automated, which can remove human subjectivity and waste from the process, and which can improve speed and efficiency of the process and conserve computing resources (e.g., processor resources, memory resources, and/or the like). For example, the route management platform can, without human intervention, automatically generate and provide an autonomous vehicle with the set of navigational instructions of the route. This can cause the autonomous vehicle to process the set of navigational instructions and begin navigating the route. This eliminates a need for a human user to view the set of navigational instructions and/or eliminates a need for a human user to pilot the vehicle, thereby conserving resources that would otherwise be used to display the set of navigational instructions on a user interface, reducing chances of human error while implementing the set of navigational instructions, improving quality and efficiency of the process, and/or the like. Additionally, implementations described herein use a rigorous, computerized process to perform tasks or roles that were not previously performed.

FIGS. 1A-1H are diagrams of one or more example implementations 100 described herein. Example implementation(s) 100 can include a user device associated with a vehicle, a route management platform, and a set of data storage devices (shown as Data Storage Device 1, Data Storage Device 2, Data Storage Device 3, and Data Storage Device 4). As shown in FIGS. 1A-1H, the route management platform can provide the user device with a set of navigational instructions for a route that is compliant with one or more route restrictions and that includes one or more fuel stops.

A "route," as used herein, can include an origin location that identifies a starting location of the route, a set of stops that a vehicle is to travel visit, and a destination location that identifies an end location of the route. Additionally, the route can be said to include a set of legs that represent geographic areas or segments along the route. For example, a first leg of the route can be defined by a portion of the route between the origin location and a first stop, one or more intermediary legs can be defined by portions of the route that are between two connecting stops (e.g., area portion of the route between the first stop and a second stop, a portion of the route between the second stop and a third stop, and/or the like), and a final leg can be defined by a portion of the route between a final stop and a destination location (or between a penultimate stop and the final stop, if the final stop is the destination location). As used herein, a starting point in a leg can be referred to as a leg origin location, and an ending point in a leg can be referred to as a leg destination location (e.g., the first leg can have a leg origin location that is the origin location of the route and a leg destination location of the first stop).

As shown in FIG. 1A, and by reference number 105, a first data storage device (shown as Data Storage Device 1) can store route restriction data and/or other related data. For example, the first data storage device can store route restriction data and/or other related data in a manner that is accessible to the route management platform, as will be described further herein.

In some implementations, the route restriction data can identify a set of route restrictions that can be considered by a navigation service. For example, the route restriction data for a route restriction can include waypoints data that identifies a set of waypoints that a vehicle can be required to travel through, data identifying a set of rules that define whether the vehicle is required to travel through at least one of the set of waypoints, and/or the like. A route can be said to comply or be in compliance with a route restriction if the route passes through one or more of the set of waypoints identified by the route restriction.

A waypoint can be defined by a set of geographic coordinates, a geographic area defined using one or more sets of geographic coordinates, a geographic area defined using a radius and a set of geographic coordinates, a geographic area defined by one or more pre-existing landmarks (e.g., an area can be defined to be that of a city, a county, a state, and/or the like), and/or the like. The set of rules can include a first rule indicating that a vehicle located in a defined origin area (referred to hereafter as a route restriction origin area) is required to travel through at least one of the set of waypoints, a second rule indicating that a vehicle traveling to a defined destination area (referred to hereafter as a route restriction destination area) is required to travel through at least one of the set of waypoints, a third rule indicating that a vehicle traveling through a defined intermediate area along a route (e.g., while traveling to a set of stops to perform deliveries) is required to travel through at least one of the set of waypoints, a fourth rule indicating that a vehicle that has a leg origin location within the route restriction origin area has to travel through at least one of the set of waypoints, a fifth rule indicating that a vehicle that has a leg destination location within the route restriction destination area has to travel through at least one of the set of waypoints, a combination of one or more of these rules, and/or the like.

As an example, assume that there is a first highway and a second highway that can be used to travel from a first city to a second city and that a shipping organization prefers that vehicles traveling from the first city to the second city use the first highway. This preference can be represented by a route restriction that uses the first city as a route restriction origin area, the second city as a route restriction destination area, and by one or more waypoints located along the first highway (such that a navigation service would select the first highway over the second highway when generating navigational instructions). The route restriction can also include a rule indicating that a vehicle must travel through the waypoint if a leg of a route of the vehicle has a leg origin location that is within the route restriction origin location and if the leg (or another leg of the route) has a leg destination location that is within the route restriction destination location.

In this example, a route that is to be used by a vehicle can begin at a location within the first city and might include one or more stops that the vehicle is to travel to before arriving at a location within the second city. Because a first leg of the route has a leg origin location within the first city (i.e., the route restriction origin area) and because a third leg of the route has a leg destination location within the second city (i.e., the route restriction destination area), the route generated by the navigation service would have to pass through the set of waypoints of the route restriction (which, as indicated above, would create a route that uses the first highway).

In some implementations, the first data storage device can store other related data. The other related data can include vehicle data for a fleet of vehicles, driver data for a group of drivers, and/or the like. For example, the vehicle data for a vehicle can include data identifying general vehicle information (e.g., data identifying a type of vehicle, a model of the vehicle, a year of the vehicle, and/or the like), data identifying a mileage of the vehicle, data identifying a total fuel capacity of the vehicle, data identifying vehicle maintenance history (e.g., data identifying oil changes, times when tires were changed, and/or the like), data identifying a set of routes that the vehicle has previously traveled, and/or the like. The driver data can include data identifying a set of preferences of the driver (e.g., preferred hours, preferred routes, etc.), data identifying an accident history (or lack thereof) for the driver, data identifying an amount of driving experience (e.g., as indicated by a number of years employed, a number of deliveries completed, and/or the like), and/or the like.

In this way, the first data storage device can store route restrictions data and/or other related data that is to be used by the route management platform when generating navigational instructions for vehicles.

Figure 1B:
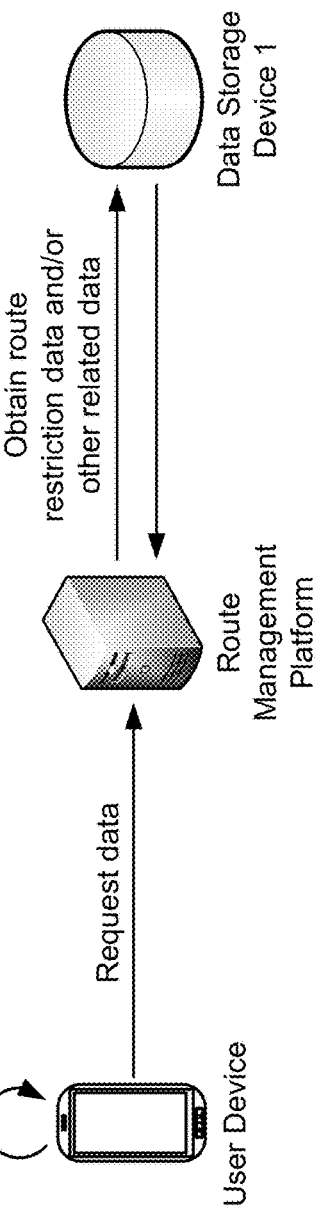

As shown in FIG. 1B, and by reference number 110, a user can interact with a user device to input a request for a set of navigational instructions of a route that is compliant with one or more route restrictions and that includes a fuel stop. The request can include stops data that identifies a set of stops for a vehicle and fuel request data that indicates to add one or more fuel stops along the route. Additionally, or alternatively, the request can include other data that can be useful for generating the set of navigational instructions, such as data identifying an entity associated with the vehicle, data identifying a driver, data identifying the vehicle, data identifying an origin location of the vehicle, fuel data that identifies an amount of available fuel of the vehicle, and/or the like, as will be further described elsewhere herein.

In some implementations, the user device used to input the request can be a mobile device of the driver of the vehicle that is tasked with performing a set of deliveries. In some implementations, the user device used to input the request can be a device (e.g., a mobile device, a laptop computer, a desktop computer, and/or the like) associated with a fleet manager of a shipping organization. In this case, the fleet manager can create the request on behalf of the driver. In some implementations, another device or machine can be used to input the request. For example, the vehicle can include an onboard navigation service that allows the driver to input the request from the vehicle, one or more processors that can automatically submit the request based on configurable rules (e.g., if the vehicle is an autonomous vehicle that is provided scheduling information that indicates to submit requests based on one or more triggers), and/or the like.

In some implementations, the request can be provided as part of a navigation service. For example, the user device can be configured with an application (e.g., a mobile application, a desktop application, etc.) that interacts with the navigation service. Additionally, or alternatively, the user device can have access to an application (e.g., a web application) that includes the navigation service. In some implementations (as shown), submitting the request can cause the request to be provided to the route management platform.

As shown by reference number 115, the route management platform can obtain the route restrictions data and/or other related data from the first data storage device. For example, the route management platform can reference a data structure associated with the first data storage device to obtain the route restrictions data. In this case, the route management platform can reference the data structure using information included in or associated with the request. For example, the request can include an identifier of the shipping organization and the route management platform can use the identifier to search the data structure for route restriction data that corresponds to a matching identifier of the shipping organization. As another example, a device identifier of the user device can be provided with (or in addition to) the request, and the route management platform can use the device identifier to search the data structure for route restriction data that corresponds to a matching device identifier of the user device.

Additionally, or alternatively, the route management platform can obtain other related data from the first data storage device. For example, the route management platform can use information included in or associated with the request (e.g., an identifier of the driver, an identifier of the vehicle, etc.) to search the data structure for driver data for the driver and/or vehicle data for the vehicle, in a manner similar to that described above.

In this way, the route management platform obtains route restriction data and/or other related data that can be used to process the request.

Figure 1C:
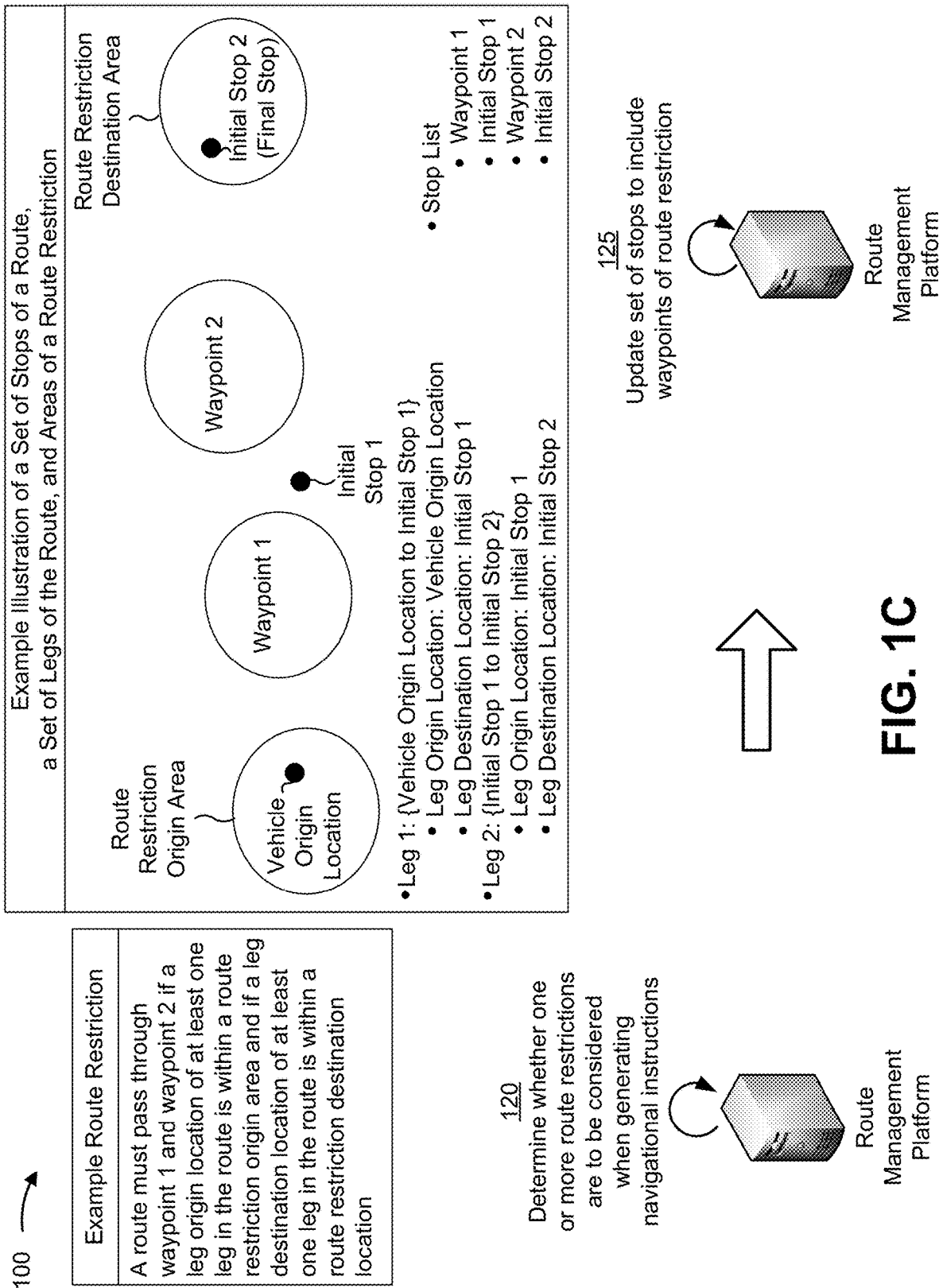

As shown in FIG. 1C, and by reference number 120, the route management platform can determine whether one or more route restrictions are to be considered when generating the set of navigational instructions. For example, the route management platform can perform one or more processing operations on the route restrictions data and/or data included in the request to determine whether each route restriction, of the set of route restrictions, is to be considered when generating the set of navigational instructions (e.g., a route restriction will be considered if the route is required to comply with the route restriction).

As shown in FIG. 1C as an example, the route management platform can process the route restriction data for a route restriction to identify a set of waypoints (shown as waypoint 1 and waypoint 2) and one or more rules included in the route restriction. In this example, a rule can indicate that a route is required to pass through waypoint 1 and waypoint 2 if a leg origin area is within a route restriction origin area and if a leg destination area is within a route restriction destination area. To make this determination, the route management platform can identify a set of legs of an initial route and can compare leg origin areas and leg destination areas to the route restriction origin area and the route restriction destination area to determine whether the rule is satisfied (which would require the route to pass through waypoint 1 and waypoint 2).

As shown as a specific example, the route management platform can identify a first leg of the route by using an origin location of the route (e.g., which can be provided in the request) as a leg origin location and can process the stops data to identify a first stop that can be used as a leg destination area of the first leg. The route management platform can continue processing the stops data until a leg origin area and a leg destination area have been identified for each leg of the route. Additionally, the route management platform can determine whether the route is required to pass through waypoint 1 and waypoint 1 by comparing the leg origin locations of each leg to the route restriction origin area and by comparing the leg destination locations of each leg to the route restriction destination area. The route will be required to pass through waypoint 1 and waypoint 2 if a match is found from each respective comparison.

In some implementations, the route management platform can determine whether a route restriction is to be considered based on the other related data obtained from the first data storage device. For example, vehicle data and/or driver data can include scheduling information that can identify the set of stops that the vehicle and/or driver is to make, preferences information for the vehicle and/or driver (e.g., a route restriction might only apply to a specific driver or vehicle), and/or the like. In this case, the route management platform can determine whether a route restriction is to be considered by processing the other related data.

As shown by reference number 125, the route management platform can update the set of stops to include the set of waypoints of the route restriction. For example, the set of stops can be initially defined by the stops data included in the request, and the route management platform can update the stops data such that the set of stops includes the set of waypoints of the route restriction. In the example shown, the route management platform can have a stop list with two stops (shown as initial stop 1 and initial stop 2) and can update the stop list to include two additional stops (e.g., a stop for waypoint 1 and a stop for waypoint 2).

In this way, the route management platform is able to update the set of stops to include the set of waypoints included in the route restriction.

Figure 1D:
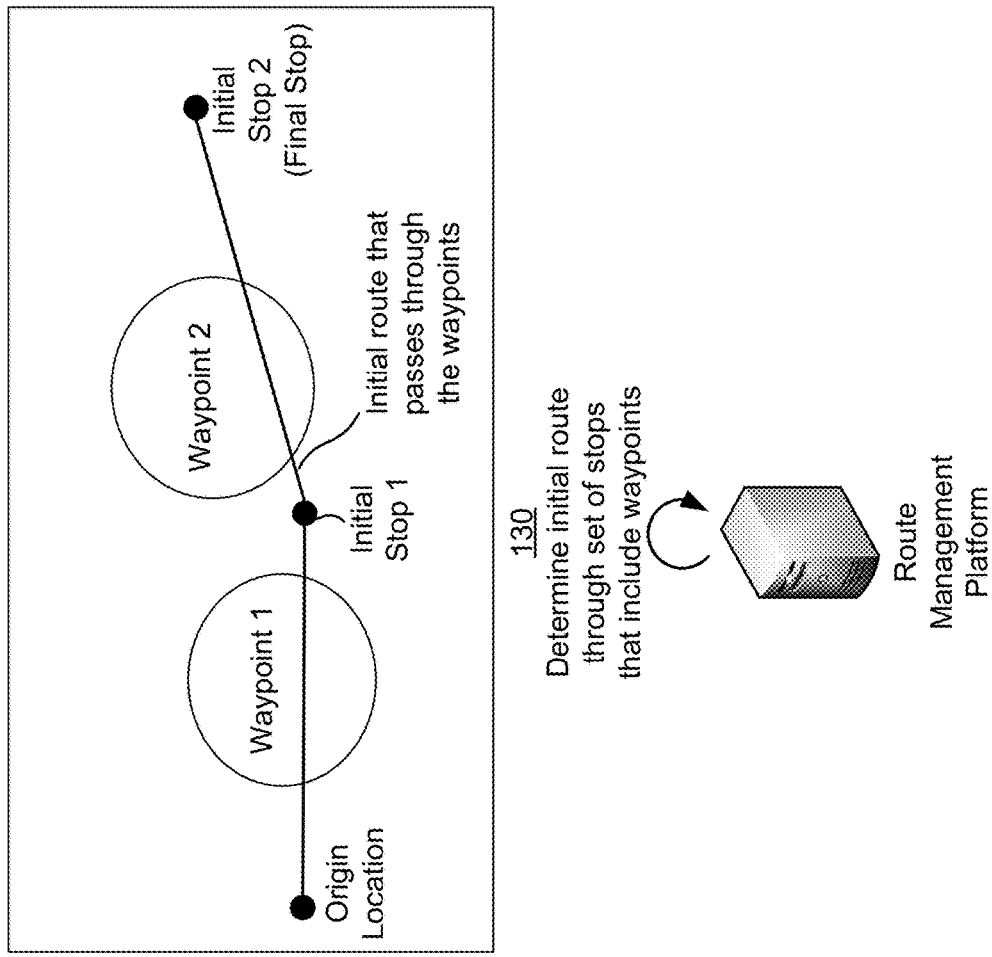

As shown in FIG. 1D, and by reference number 130, the route management platform can determine an initial route through the set of stops that includes the set of waypoints. For example, the route management platform can perform one or more path-finding techniques that determine a best-fit path from the origin location to a destination location (shown as initial stop 2), where the initial route passes through each stop in the set of stops. The one or more path-finding techniques can include techniques that determine a most cost-effective path, a most time-efficient path, a safest path, and/or the like.

In this way, the route management platform determines an initial route that passes through the set of stops (e.g., which includes the initial set of stops identified in the request and the set of waypoints of the route restriction).

Figure 1E:
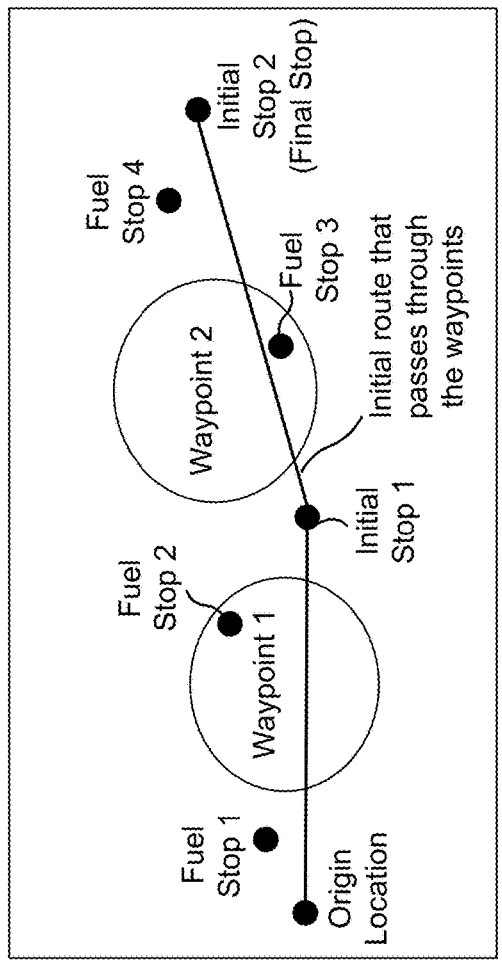
Figure 1E:
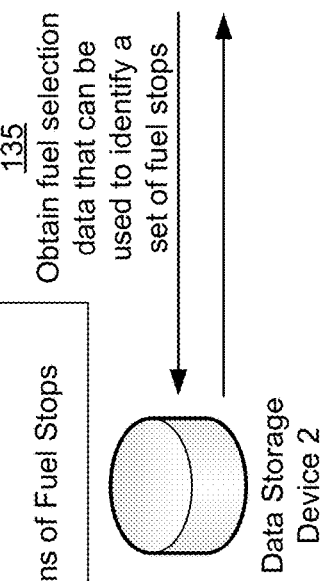

As shown in FIG. 1E, and by reference number 135, the route management platform can obtain fuel selection data that can be used to identify a set of fuel stops. For example, the route management platform can obtain fuel selection data from a second data storage device (shown as Data Storage Device 2). The fuel selection data can include data identifying a set of fuel stops (e.g., a shipping organization can have a contract to purchase fuel exclusively from a particular fuel supplier), data identifying a current price of fuel at particular fuel stops, data identifying geographic locations of the set of fuel stops, and/or the like.

In some implementations, the route management platform can obtain the fuel selection data by referencing a data structure associated with the second data storage device. For example, the route management platform can use information included in or associated with the request, such as the identifier of the shipping organization, to search the data structure for fuel selection data that is stored in association with a corresponding identifier of the shipping organization. In some implementations, the route management platform can provide a request to the second data storage device that includes the identifier of the shipping organization, to cause the second data storage device to provide the route management platform with the fuel selection data.

As shown by reference number 140, the route management platform can identify a subset of fuel stops that are to be considered as potential stops to add to the set of stops of a final route. For example, the route management platform can identify a subset of fuel stops that are within a threshold distance of the initial route. In this case, the route management platform can be configured with a rule to identify fuel stops that are within a threshold distance of the initial route, within a threshold distance of a specified location within the initial route, within a threshold distance of a leg of the initial route, and/or the like.

As an example, the route management platform can determine a distance between each fuel stop, of the set of fuel stops, and the initial route. In this case, the route management platform can determine a location within the initial route that is a closest available location to a fuel stop and can calculate a distance between the location and the fuel stop. Additionally, the route management platform can compare the distance to the threshold distance to determine whether the fuel stop is within the threshold distance of the initial route. If the distance satisfies the threshold distance, the route management platform can identify the fuel stop as a fuel stop that is to be considered as a stop in a final route, as described further herein.

As shown as a specific example, the set of fuel stops can include 800 fuel stops within geographic region A (e.g., a state, a portion of a country, etc.). In this example, the route management platform can identify fuel stop 1, fuel stop 2, fuel stop 3, and fuel stop 4, as being part of a subset of fuel stops that are within a threshold distance of the route. The route management platform will perform additional processing to determine which of these four fuel stops will be added as a stop to the final route.

In this way, the route management platform identifies a subset of fuel stops that can be considered as potential stops to add to the final route.

Figure 1F:
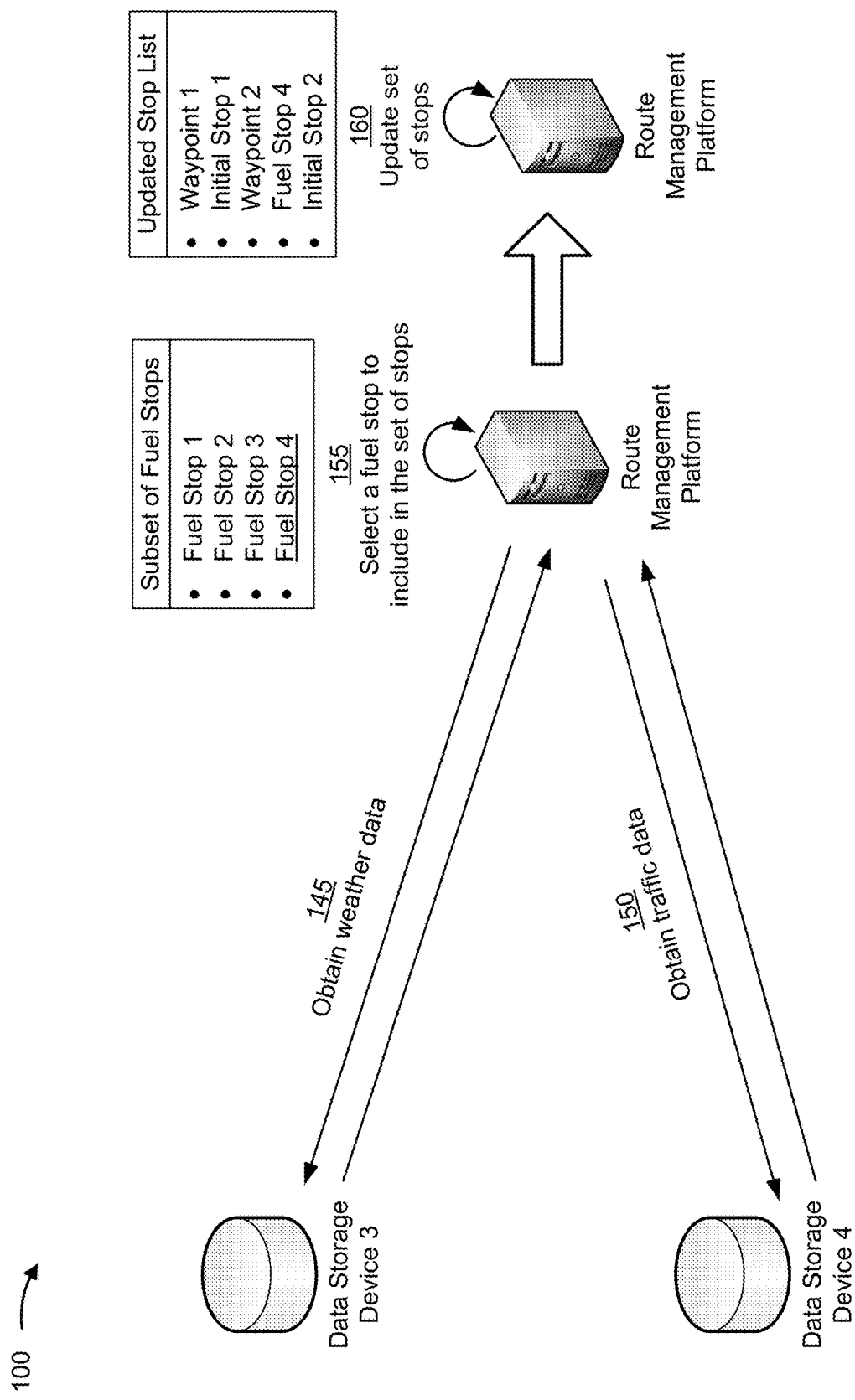

As shown in FIG. 1F, and by reference number 145, the route management platform can obtain weather data that identifies a weather forecast for areas that are near the subset of fuel stops. For example, the route management platform can obtain weather data from a third data storage device (shown as Data Storage Device 3). In this case, the third data storage device can be a website that reports real-time weather or a similar type of data source, and the route management platform can use an application programming interface (API) or a similar type of interface to obtain the weather data.

As shown by reference number 150, the route management platform can obtain traffic data for traffic within a threshold distance of the subset of fuel stops. For example, the route management platform can obtain traffic data from a fourth data storage device (shown as Data Storage Device 4). In this case, the fourth data storage device can be a website that reports real-time traffic or a similar type of data source, and the route management platform can use an API or a similar type of interface to obtain the traffic data.

As shown by reference number 155, the route management platform can select a fuel stop to include in the set of stops. For example, the route management platform can select a fuel stop, of the subset of identified fuel stops, using one or more fuel stop selection techniques (e.g., a data model trained using machine learning, a rules engine, and/or the like). In this case, the one or more fuel stop selection techniques can select a fuel stop based on the fuel data that identifies an amount of available fuel within the vehicle, the fuel cost data that identifies a cost of fuel at the subset of fuel stops, the weather data that identifies the weather forecast for areas that are near the subset of fuel stops, the traffic data that identifies the traffic within the threshold distance of the subset of fuel stops, and/or the like.

In some implementations, the route management platform can select a fuel stop using a data model that has been trained using machine learning. For example, the route management platform can train a data model on historical data using one or more machine learning techniques (or can be provided a trained data model from another device). The historical data can include historical fuel data, historical fuel cost data, historical weather data, historical traffic data, and/or the like. The one or more machine learning techniques can include a classification technique, a regression technique, a technique using a neural network, and/or the like.

To train the data model, the route management can first identify a set of features. The set of features can serve as indicators of a likelihood of a particular fuel stop being an optimal fuel stop to add to the set of stops. The set of features can include features based on historical fuel data values, historical fuel cost values, historical weather data values, historical traffic data values, combinations of historical data values, and/or the like.

As an example, the set of features can include a feature indicating that an amount of fuel in a vehicle can be an indicator that whether a fuel stop is an optimal fuel stop (e.g., if the vehicle has low fuel, a fuel stop closer to the vehicle is more likely to be an optimal fuel stop than a fuel stop that is far away from the vehicle). As another example, the set of features can include a feature indicating that a fuel cost above or below a threshold cost can be an indicator of whether a fuel stop is an optimal fuel stop (e.g., a shipping organization might be contracted to receive a range of possible prices, and might prefer that vehicles travel to fuel stops that offer prices near a lower bound part of the price range).

As another example, the set of features can include a feature indicating that a particular weather forecast is an indicator of whether a fuel stop is an optimal fuel stop (e.g., if a storm is approaching, the weather forecast describing the storm can be an indicator that a nearby fuel stop is an optimal fuel stop, such that the vehicle can fuel up prior to being impacted by the storm). As another example, the set of features can include a feature indicating that an amount of traffic that a vehicle would travel through to stop at a fuel stop is an indicator of whether the fuel stop is an optimal fuel stop (e.g., a fuel stop that is surrounded by heavy traffic can be an indicator that the fuel stop is not an optimal fuel stop).

Additionally, the route management platform can use the trained data model to select a fuel stop. For example, the route management platform can provide, as input to the data model, data identifying the initial route, data identifying the one or more fuel stops, data identifying an amount of fuel in the vehicle, fuel cost data for the one or more fuel stops, traffic data for traffic near the initial route and/or the one or more fuel stops, weather data for weather near the initial route and/or the one or more fuel stops, and/or the like (collectively referred to as input data). In this case, the data model can process the input data to generate a set of values that indicate likelihoods of the one or more fuel stops being a best-fit fuel stop to include in the set of stops of the route. Additionally, the route management platform can select the fuel stop with the highest likelihood of being the best-fit fuel stop. In the example shown, the route management platform can select fuel stop 4 from the subset of fuel stops that include fuel stop 1, fuel stop 2, fuel stop 3, and fuel stop 4.

As shown by reference number 160, the route management platform can update the set of stops to include the selected fuel stop. For example, as shown, the stops data that identifies the set of stops can be updated to include waypoint 1 as a first stop, initial stop 1 as a second stop, waypoint 2 as a third stop, fuel stop 4 as a fourth stop, and initial stop 2 as a fifth stop.

In some implementations, the route management platform can use a third-party fuel planning service to obtain an updated set of stops. For example, the route management platform can provide the third-party fuel planning service with information included in the request, data identifying the initial route, fuel data, fuel cost data, weather data, traffic data, stops data identifying the initial set of stops, and/or any other data that can be used to select a fuel stop (referred to collectively as input data). In this case, the fuel planning service can process the input data to select a stop and can provide the route management platform with data identifying the fuel stop that has been selected and/or stops data that includes an updated set of stops that include the fuel stop.

In this way, the route management platform is able to determine (or receive) an updated set of stops that includes the set of waypoints and the selected fuel stop.

Figure 1G:
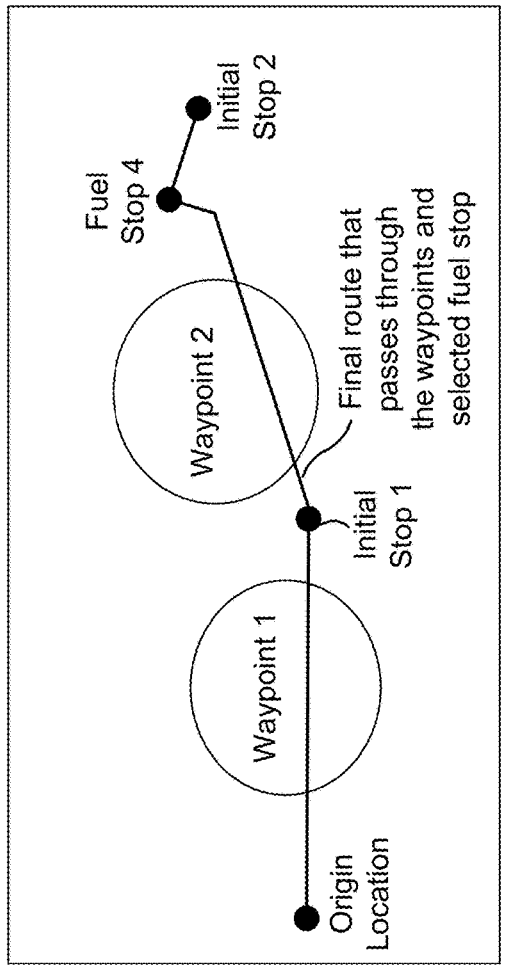
Figure 1G:
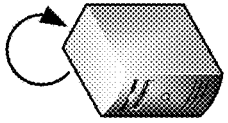

As shown in FIG. 1G, and by reference number 165, the route management platform can determine the set of navigational instructions of a final route that includes the set of waypoints and the fuel stop. For example, the route management platform can perform one or more path-finding techniques (as described elsewhere herein) to determine the set of navigational instructions of a final route that passes through the set of waypoints and the fuel stop. As shown as an example, the route management platform can determine the set of navigational instructions of a final route that passes through waypoint 1, initial stop 1, waypoint 2, fuel stop 4, and initial stop 2.

In this way, the route management platform is able to determine the set of navigational instructions of a final route that includes the set of waypoints and the fuel stop.

Figure 1H:
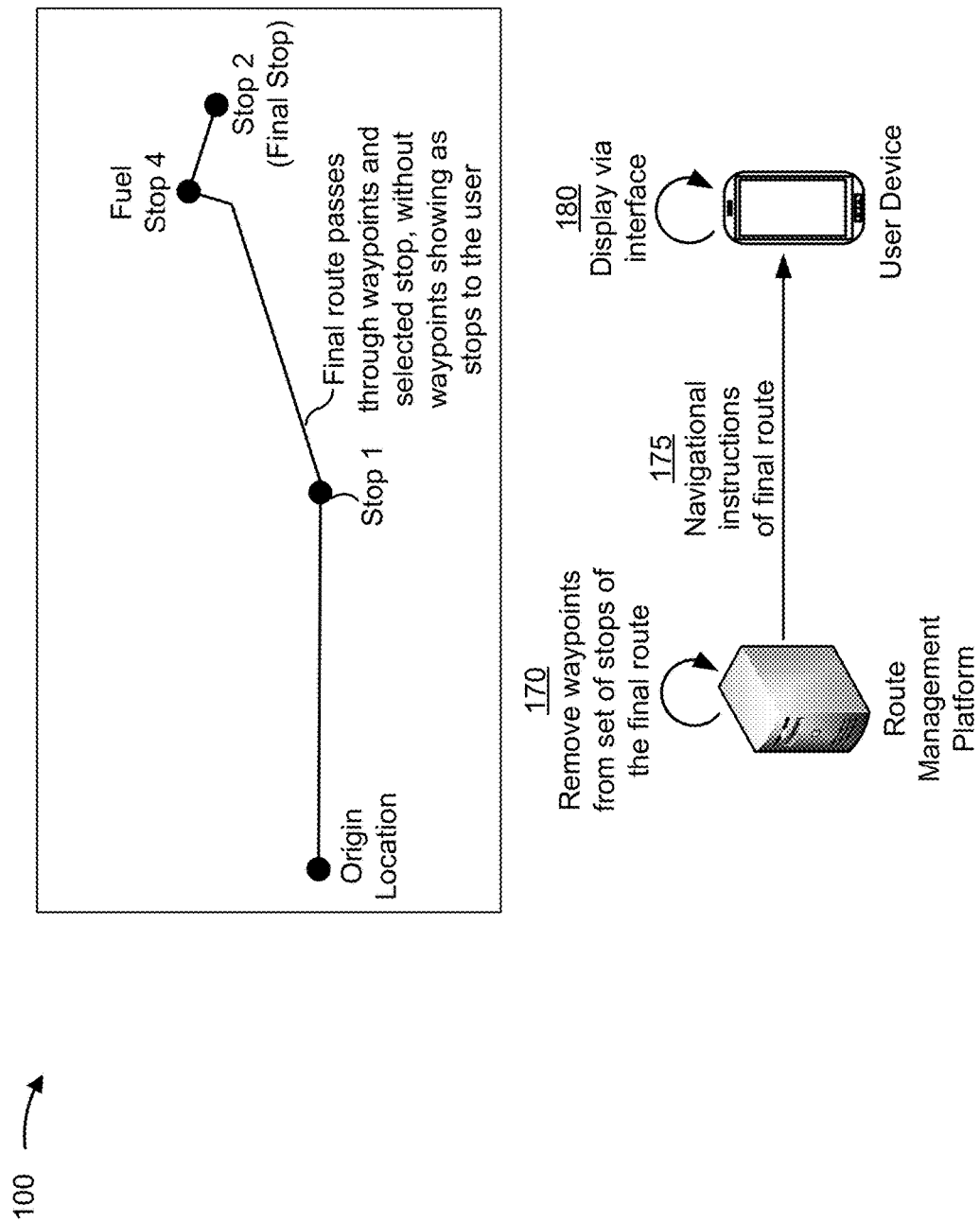

As shown in FIG. 1H, and by reference number 170, the route management platform can remove the set of waypoints from the set of stops of the final route. For example, the route management platform can remove the set of waypoints from the set of stops, such that the set of navigational instructions of the final route do not identify the set of waypoints as stops (despite that the final route still passes through the set of waypoints). In this way, the set of navigational instructions of the final route can be provided to a driver of the vehicle in a manner that allows the driver to view the final route without seeing the set of waypoints as stops in the final route.

As shown by reference number 175, the route management platform can provide, to the user device, the set of navigational instructions of the final route. For example, the route management platform can provide the set of navigational instructions of the final route to the user device using a communication interface, such as an API or another type of interface.

In some implementations, the route management platform can provide the final route to a first user device (e.g., a user device associated with a manager of the shipping organization) and the first user device can provide the final route to a second user device (e.g., a user device associated with the driver of the vehicle). In some implementations, the route management platform can provide the final route to another device (e.g., instead of to the user device), to multiple devices, and/or the like. For example, the route management platform can provide the final route to the first user device, to the second user device, to the vehicle (e.g., to an onboard navigation system of the vehicle, to one or more processors of the vehicle, and/or the like), to a data storage device, and/or to another device associated with a shipping organization.

As shown by reference number 180, the user device can display the final route via an interface. For example, the user device can display the final route using an application interface, a web interface, and/or the like. In this case, an application or website can display the final route such that the set of waypoints are not visible as stops in the final route.

In some implementations, the route management platform can provide the final route to an autonomous vehicle. For example, an autonomous vehicle can be configured with a navigation system that is able to receive the set of navigational instructions of the final route as an input. In this case, the autonomous vehicle can, for example, process the set of navigational instructions to begin traveling to the set of stops of the final route.

In some implementations, the route management platform can periodically provide the user device (or another device) with a new route. For example, while the vehicle is traveling to the set of stops of the final route (e.g., to perform a set of deliveries), the route management platform can receive new fuel selection data that is to be used to identify an updated set of fuel stops. In this case, the route management platform can determine, based on the new fuel selection data, a new initial route through one or more remaining stops of the set of stops. Additionally, the route management platform can identify one or more fuel stops from the updated set of fuel stops that are within a threshold distance of the new initial route. Furthermore, the route management platform can select a particular fuel stop, of the one or more identified fuel stops, to include in the one or more remaining stops. In some implementations, the route management platform can determine an updated set of navigational instructions for the new route. The new route can include the particular fuel stop and the one or more remaining stops. In some implementations, the route management platform can provide the user device (or the other device) with the new route.

In this way, the route management platform generates and provides the user device with an optimal route that is compliant with the route restriction and that includes the fuel stop. By using the process described herein to generate and provide the user device with the optimal route, the route management platform conserves resources (e.g., processing resources, network resources, memory resources, and/or the like) that would otherwise be used to generate and provide the user device with an inefficient route (e.g., by using a fuel planning service that is unable to consider route restrictions when selecting fuel stops, by using a fuel planning service that is unable to effectively consider route restrictions when selecting fuel stops, etc.).

As indicated above, FIGS. 1A-1H are provided merely as examples. Other examples can differ from what is described with regard to FIGS. 1A-1H. For example, there can be additional devices and/or networks, fewer devices and/or networks, different devices and/or networks, or differently arranged devices and/or networks than those shown in FIGS. 1A-1H. Furthermore, two or more devices shown in FIGS. 1A-1H can be implemented within a single device, or a single device shown in FIGS. 1A-1H can be implemented as multiple and/or distributed devices. Additionally, or alternatively, a set of devices (e.g., one or more devices) of example implementation(s) 100 can perform one or more functions described as being performed by another set of devices of example implementation(s) 100.

Figure 2:
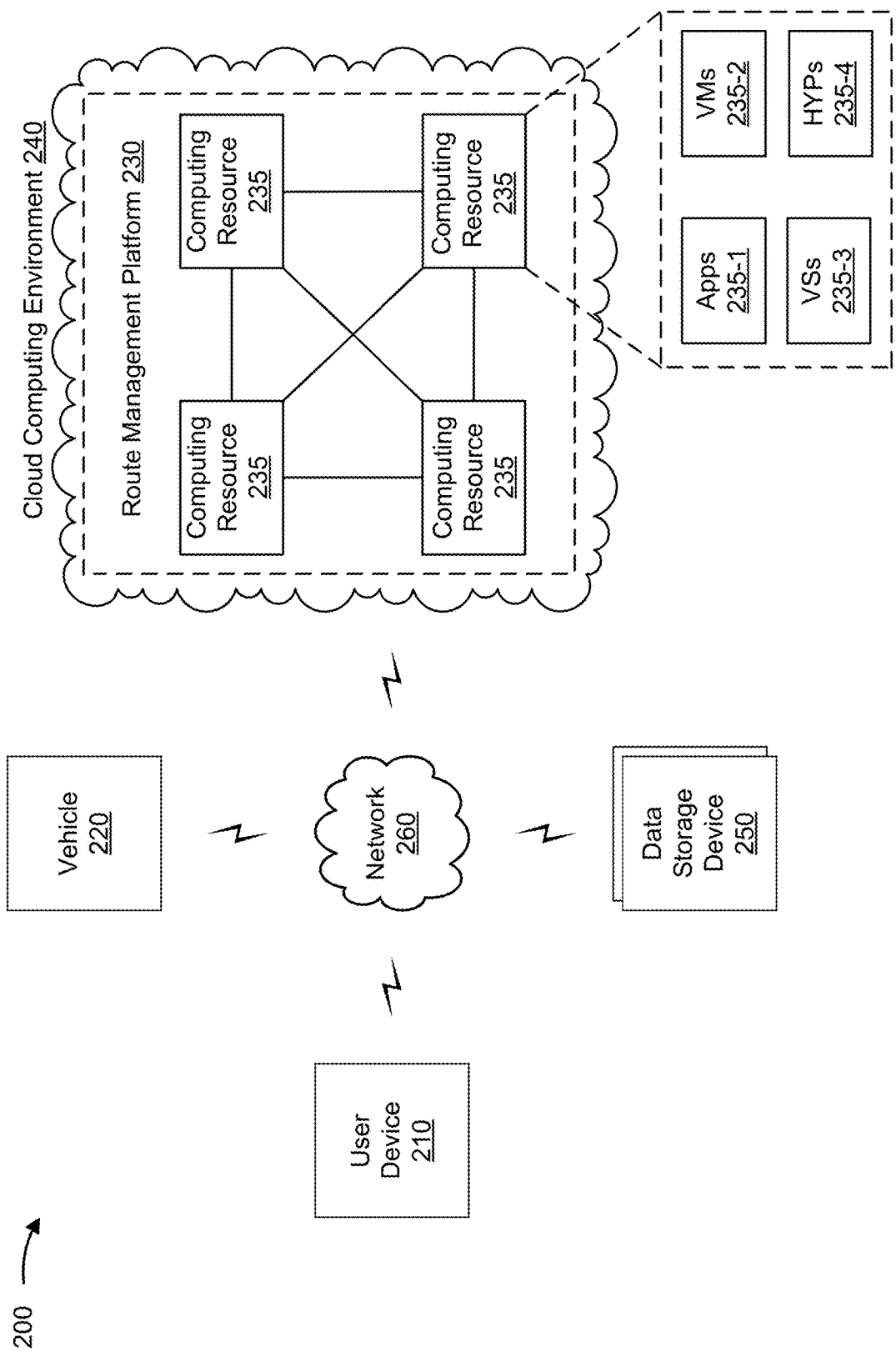
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a user device 210, a vehicle 220, a route management platform 230 hosted within a cloud computing environment 240, a data storage device 250, and/or a network 260. Devices of environment 200 can interconnect via wired connections, wireless connections, or a combination of wired and wireless connections.

User device 210 includes one or more devices capable of receiving, generating, storing, processing, and/or providing information associated with a set of navigational instructions for a route. For example, user device 210 can include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 can be a device of an owner or a driver of vehicle 220. In some implementations, user device 210 can be affixed to or part of vehicle 220. In some implementations, a first user device 210 can be a desktop computer, laptop computer, or a similar type of device, that is operated by a fleet manager of a shipping organization. In this case, a second user device 210 can be a device accessible to a driver of vehicle 220.

In some implementations, user device 210 can provide a request for a set of navigational instructions to route management platform 230. In some implementations, user device 210 can receive the set of navigational instructions from route management platform 230.

In some implementations, the first user device 210 (defined above) can provide the request to route management platform 230, and the second user device 210 (defined above) can receive the set of navigational instructions from route management platform 230. In other cases, route management platform 230 can provide the set of navigational instructions to the first user device 210, and the first user device 210 can provide the set of navigational instructions to the second user device 210.

Vehicle 220 includes a mobile machine (e.g., that transports people and/or cargo). For example, a vehicle can include a motorized vehicle (e.g., a truck, a car, a bus, and/or the like), a railed vehicle (e.g., a train or a tram), a watercraft (e.g., a ship, a boat, a submarine, etc.), an aircraft (e.g., a plane, a glider, or an unmanned aerial vehicle (UAV)), a spacecraft, an electric vehicle (e.g., an electric truck or car), a moped, a scooter, and/or the like. In some implementations, vehicle 220 can include an autonomous vehicle, such as an autonomous truck or car, an autonomous boat, and/or the like. In some implementations, vehicle 220 can include a navigational system (e.g., a GPS system, etc.). In some implementations, vehicle 220 can provide a request for a set of navigational instructions to route management platform 230. In some implementations, vehicle 220 can receive the set of navigational instructions from route management platform 230.

Route management platform 230 includes one or more devices capable of receiving, storing, generating, determining, and/or providing information associated with a set of navigational instructions. For example, route management platform 230 can include a server device (e.g., a host server, a web server, an application server, etc.), a data center device, or a similar device. In some implementations, route management platform 230 can obtain fuel selection data from a first data storage device 250. In some implementations, route management platform 230 can obtain route restrictions data from a second data storage device 250. In some implementations, one or more steps described herein as being performed by route management platform 230 can be performed a third-party fuel planning service, by a user device 210 and/or a vehicle 220 that locally supports intelligence needed to perform the one or more steps, and/or the like.

In some implementations, as shown, route management platform 230 can be hosted in cloud computing environment 240. Notably, while implementations described herein describe route management platform 230 as being hosted in cloud computing environment 240, in some implementations, route management platform 230 might not be cloud-based (i.e., can be implemented outside of a cloud computing environment) or can be partially cloud-based.

Cloud computing environment 240 includes an environment that hosts route management platform 230. Cloud computing environment 240 can provide computation, software, data access, storage, etc. services that do not require end-user knowledge of a physical location and configuration of system(s) and/or device(s) that hosts route management platform 230. As shown, cloud computing environment 240 can include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 can host route management platform 230. The cloud resources can include compute instances executing in computing resource 235, storage devices provided in computing resource 235, data transfer devices provided by computing resource 235, and/or the like. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 can include one or more software applications that can be provided to or accessed by user device 210, vehicle 220, and/or data storage device 250. Application 235-1 can eliminate a need to install and execute the software applications on these devices. For example, application 235-1 can include software associated with route management platform 230 and/or any other software capable of being provided via cloud computing environment 240. In some implementations, one application 235-1 can send/receive information to/from one or more other applications 235-1, via virtual machine 235-2.

Virtual machine 235-2 can include a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program and can support a single process. In some implementations, virtual machine 235-2 can execute on behalf of another device (e.g., user device 210, vehicle 220, data storage device 250, etc.), and can manage infrastructure of cloud computing environment 240, such as data management, synchronization, or long-duration data transfers.

Virtualized storage 235-3 can include one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 can provide hardware virtualization techniques that allow multiple operating systems (e.g., "guest operating systems") to execute concurrently on a host computer, such as computing resource 235. Hypervisor 235-4 can present a virtual operating platform to the guest operating systems and can manage the execution of the guest operating systems. Multiple instances of a variety of operating systems can share virtualized hardware resources.

Data storage device 250 includes one or more devices capable of receiving, storing, generating, determining, and/or providing information associated with route restrictions and/or fuel stops. For example, data storage device 250 can include a server device or a group of server devices. In some implementations, a first data storage device 250 can store fuel selection data. In some implementations, a second data storage device 250 can store route restrictions data. In some implementations, a third data storage device 250 can store weather data. In some implementations, a fourth data storage device 250 can store traffic data. In some implementations, data storage device 250 can be accessible to route management platform 230. In some implementations, data storage device 250 can be part of route management platform 230.

Network 260 includes one or more wired and/or wireless networks. For example, network 260 can include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
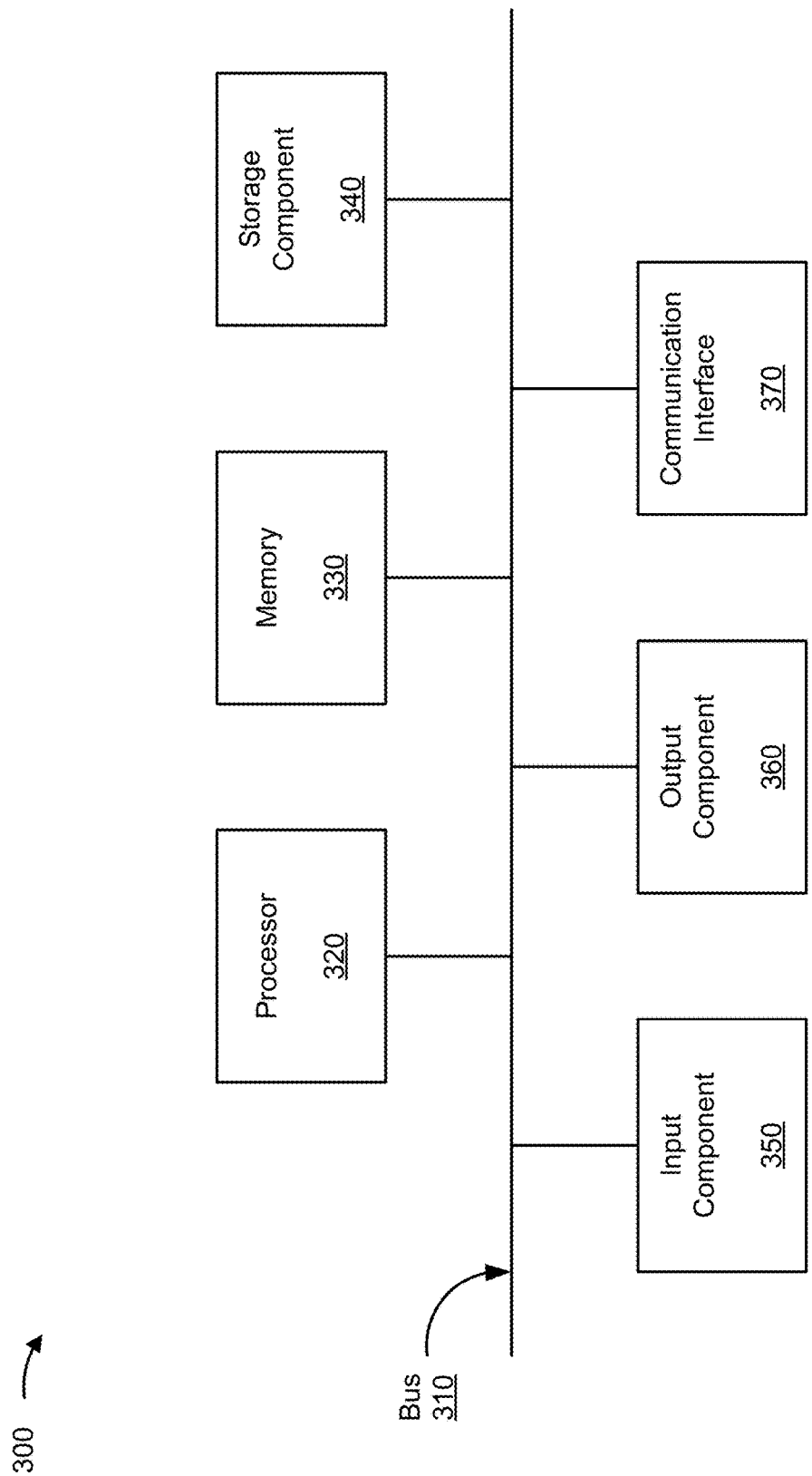
FIG. 3 is a diagram of example components of one or more devices of FIG. 2.

FIG. 3 is a diagram of example components of a device 300. Device 300 can correspond to user device 210, vehicle 220, route management platform 230, and/or data storage device 250. In some implementations, user device 210, vehicle 220, route management platform 230, and/or data storage device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4A:
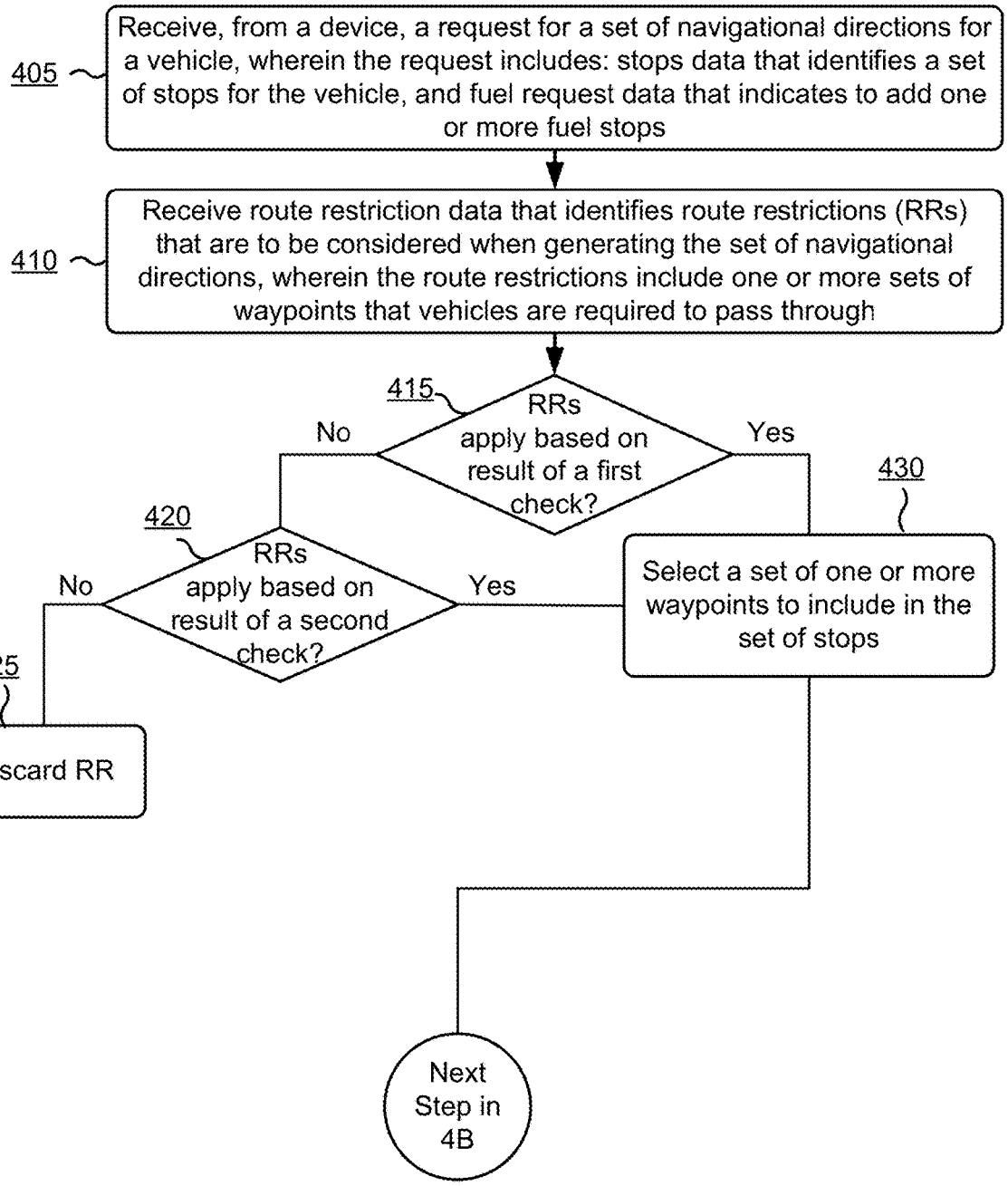
FIGS. 4A and 4B are a flow chart of an example process for determining and providing a device with a route that is to be taken by a vehicle, where the route is compliant with one or more route restrictions and includes one or more fuel stops as part of the route.
Figure 4B:
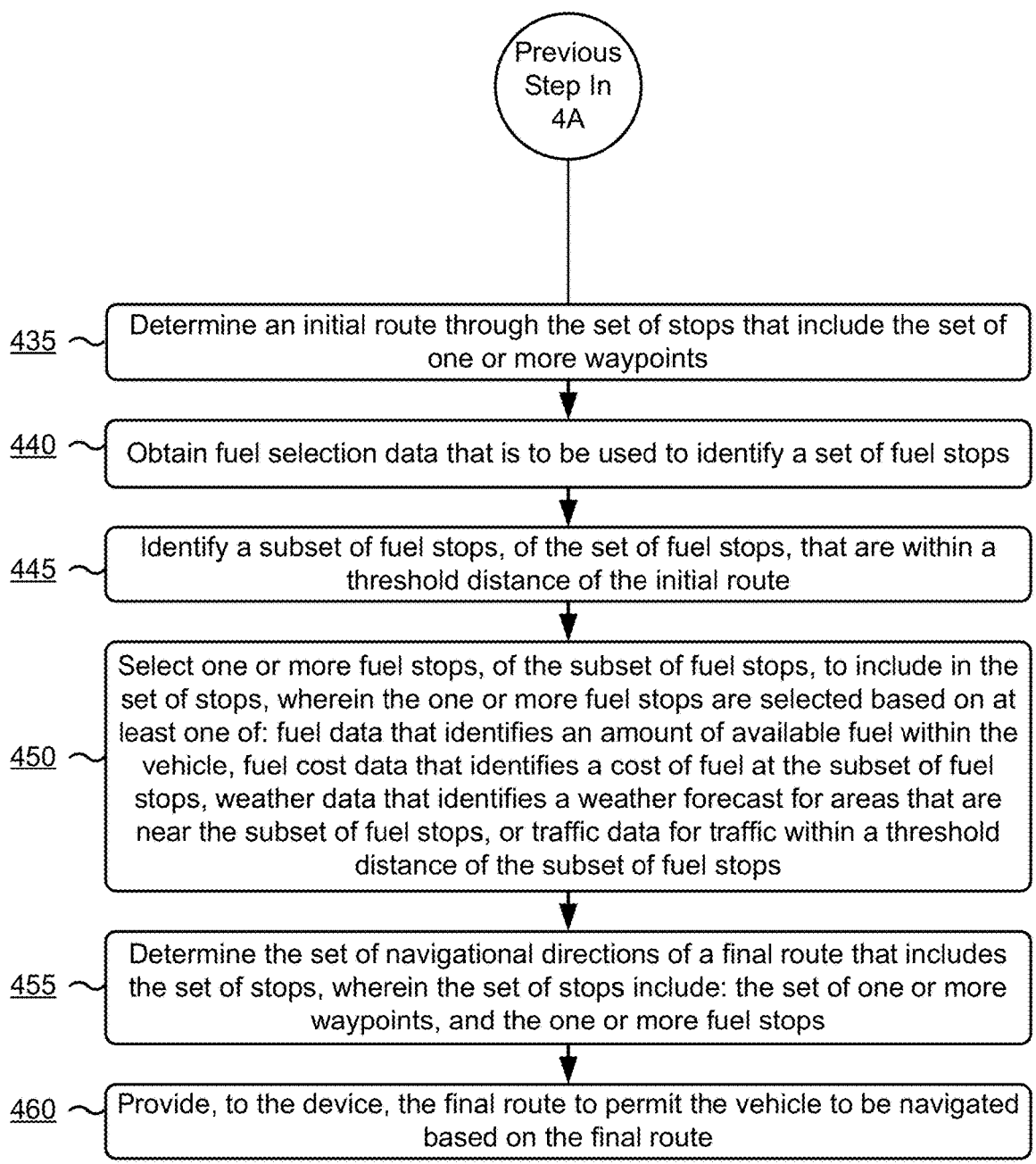

FIGS. 4A-4B depict a flow chart of an example process 400 for determining and providing a device with a route that is to be taken by a vehicle, where the route is compliant with one or more route restrictions and includes one or more fuel stops as part of the route. In some implementations, one or more process blocks of FIGS. 4A-4B can be performed by a route management platform (e.g., route management platform 230). In some implementations, one or more process blocks of FIGS. 4A-4B can be performed by another device or a group of devices separate from or including a user device (e.g., user device 210), a vehicle (e.g., vehicle 220), and/or a data storage device (e.g., data storage device 250).

As shown in FIG. 4A, process 400 can include receiving, from a device, a request for a set of navigational instructions for a vehicle, wherein the request includes stops data that identifies a set of stops for the vehicle, and fuel request data that indicates to add one or more fuel stops (block 405). For example, the route management platform (e.g., using computing resource 235, processor 320, input component 350, and/or communication interface 370) can receive, from a device (e.g., user device 210), a request for a set of navigational instructions for a vehicle (e.g., vehicle 220), as described above. In some implementations, the request can include stops data that identifies a set of stops for the vehicle and fuel request data that indicates to add one or more fuel stops.

As further shown in FIG. 4A, process 400 can include receiving route restriction data that identifies route restrictions that are to be considered when generating the set of navigational instructions, wherein the route restrictions include one or more sets of waypoints that vehicles are required to pass through (block 410). For example, the route management platform (e.g., using computing resource 235, processor 320, input component 350, and/or communication interface 370) can receive route restriction data that identifies route restrictions that are to be considered when generating the set of navigational instructions, as described above. In some implementations, the route restrictions can include one or more sets of waypoints that vehicles are required to pass through.

As further shown in FIG. 4A, process 400 can include determining whether the route restrictions apply based on a result of a first check (block 415). For example, the route management platform (e.g., using computing resource 235, processor 320, and/or memory 330) can determine whether the route restrictions apply based on a result of a first check. In some implementations, the route management platform can, as part of the first check, identify one or more rules associated with each of the route restrictions, and can perform one or more processing operations (as described elsewhere herein) to determine whether the one or more rules associated with each route restriction are satisfied.

If one or more rules associated with one or more route restrictions are not satisfied, process 400 can include determining whether the one or more route restrictions apply based on a result of a second check (block 420). For example, the route management platform (e.g., using computing resource 235, processor 320, and/or memory 330) can determine whether the one or more route restrictions apply based on a result of a second check. In some implementations, the route management platform can, as part of the second check, determine whether the one or more route restrictions apply based on other related data, such as driver data, vehicle data, and/or the like. For example, a certain vehicle can be required to pass through a specific waypoint of a route restriction, regardless of a result of the first check (e.g., the vehicle might be of a certain height or weight that necessitates taking a certain path).

If a route restriction, of the one or more route restrictions, does not apply (e.g., if the driver data and/or the vehicle data does not include any applicable restrictions), process 400 can include discarding the route restriction (block 425).

If one or more of the set of route restrictions applies based on the result of the first check or based on the result of the second check, process 400 can include selecting a set of one or more waypoints to include in the set of stops (block 430). For example, the route management platform (e.g., using computing resource 235, processor 320, and/or memory 330) can select a set of one or more waypoints to include in the set of stops, as described above. The set of one or more waypoints can be one or more waypoints that are identified in one or more route restrictions that apply.

As shown in FIG. 4B, process 400 can include determining an initial route through the set of stops that includes the set of one or more waypoints (block 435). For example, the route management platform (e.g., using computing resource 235, processor 320, input component 350, output component 360, and/or communication interface 370) can determine an initial route through the set of stops that includes the set of one or more waypoints, as described above.

As further shown in FIG. 4B, process 400 can include obtaining fuel selection data that is to be used to identify a set of fuel stops (block 440). For example, the route management platform (e.g., using computing resource 235, processor 320, and/or memory 330) can obtain fuel selection data that is to be used to identify a set of fuel stops, as described above.

As further shown in FIG. 4B, process 400 can include identifying a subset of fuel stops, of the set of fuel stops, that are within a threshold distance of the initial route (block 445). For example, the route management platform (e.g., using computing resource 235, processor 320, and/or memory 330) can identify a subset of fuel stops, of the set of fuel stops, that are within a threshold distance of the initial route, as described above.

As further shown in FIG. 4B, process 400 can include selecting, by the first device, one or more fuel stops, of the subset of fuel stops, to include in the set of stops, wherein the one or more fuel stops are selected based on at least one of: fuel data that identifies an amount of available fuel within the vehicle, fuel cost data that identifies a cost of fuel at the subset of fuel stops, weather data that identifies a weather forecast for areas that are near the subset of fuel stops, or traffic data for traffic within a threshold distance of the subset of fuel stops (block 450). For example, the route management platform (e.g., using computing resource 235, processor 320, and/or memory 330) can select one or more fuel stops, of the subset of fuel stops, to include in the set of stops, as described above. In some implementations, the one or more fuel stops can be selected based on at least one of: fuel data that identifies an amount of available fuel within the vehicle, fuel cost data that identifies a cost of fuel at the subset of fuel stops, weather data that identifies a weather forecast for areas that are near the subset of fuel stops, or traffic data for traffic within a threshold distance of the subset of fuel stop.

As further shown in FIG. 4B, process 400 can include determining the set of navigational instructions of a final route that includes the set of stops, wherein the set of stops include: the set of one or more waypoints, and the one or more fuel stops (block 455). For example, the route management platform (e.g., using computing resource 235, processor 320, and/or memory 330) can determine the set of navigational instructions of a final route that includes the set of stops, as described above. In some implementations, the stops can include the set of one or more waypoints and the one or more fuel stops.

As further shown in FIG. 4B, process 400 can include providing, to the device, the final route to permit the vehicle to be navigated based on the final route (block 460). For example, the route management platform (e.g., using computing resource 235, processor 320, output component 360, and/or communication interface 370) can provide, to the device (e.g., user device 210), the final route to permit the vehicle to be navigated based on the final route, as described above.

Process 400 can include additional implementations, such as any single implementation or any combination of implementations described below and/or in connection with one or more other processes described elsewhere herein.

In some implementations the final route can include the one or more fuel stops in the set of stops while remaining in compliance with a route restriction that requires the vehicle to travel through the set of one or more waypoints.

In some implementations, the route restrictions, that include the one or more sets of waypoints, also include a set of route restriction origin areas and a set of route restriction destination areas. In some implementations, the route management platform can determine, before selecting the set of one or more waypoints, a set of legs that are based on a start location and the set of stops. In some implementations, the route management platform can determine a set of leg origin areas and a set of leg destination areas for the set of legs. In some implementations, the route management platform can determine that a particular leg origin area, of the set of leg origin areas, is located within a particular route restriction origin area of the set of route restriction origin areas. In some implementations, the route management platform can determine that a particular leg destination area, of the set of leg destination areas, is located within a particular route restriction destination area of the set of route restriction destination areas. The particular route restriction origin area and the particular route restriction destination area are part of a route restriction that includes a waypoint. In some implementations, when selecting the set of one or more waypoints, the route management platform can select the waypoint, as part of the set of one or more waypoints, based on determining that the particular leg origin area is located within the particular route restriction origin area and based on determining that the particular leg destination area is located within the particular route restriction destination area.

In some implementations, the route management platform can determine a set of legs of the initial route based on a start location of the vehicle and the set of stops identified in the request. In some implementations, when selecting the set of one or more waypoints, the route management platform can select a waypoint, of the set of one or more waypoints, based on at least a part of a geographic area of a leg, of the set of legs, being included in a geographic area of the waypoint.

In some implementations, the route management platform can determine, before selecting the set of one or more waypoints, a set of legs of the initial route. The set of legs can be determined based on a start location and the set of stops identified in the request. In some implementations, when identifying the subset of fuel stops, the route management platform can identify, for a leg of the set of legs, one or more fuel stops that are within a particular threshold distance of the leg.

In some implementations, the route management platform can remove the set of one or more waypoints from the set of stops of the final route. In some implementations, when providing the final route, the route management platform can provide the final route to the second device in a manner that causes the final route to traverse through the set of one or more waypoints without the set of one or more waypoints being identified as stops in the set of stops of the final route.

In some implementations, the route management platform can receive, while the vehicle is traveling along the final route, new fuel selection data that is to be used to identify an updated set of fuel stops. In some implementations, the route management platform can determine, based on the new fuel selection data, a new initial route through one or more remaining stops of the set of stops. In some implementations, the route management platform can identify a subset of the updated set of fuel stops that are within a threshold distance of the new initial route. In some implementations, the route management platform can select one or more of the subset of the updated set of fuel stops to include as part of the one or more remaining stops. In some implementations, the route management platform can determine a new final route that includes an updated set of navigational instructions for the vehicle. The new final route includes the one or more of the subset of the updated set of fuel stops as part of the one or more remaining stops. In some implementations, the route management platform can provide the second device with the new final route.

Although FIGS. 4A and 4B show example blocks of process 400, in some implementations, process 400 can include additional blocks, fewer blocks, different blocks, or differently arranged blocks than those depicted in FIGS. 4A and 4B. Additionally, or alternatively, two or more of the blocks of process 400 can be performed in parallel.

The foregoing disclosure provides illustration and description but is not intended to be exhaustive or to limit the implementations to the precise forms disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a route management platform and from a user device, a request for a set of navigational instructions for a vehicle associated with the user device,
wherein the vehicle is associated with an organization, and
wherein the request includes:
stops data that identifies a set of operational stops for the vehicle,
wherein at least one stop of the set of operational stops is a delivery stop at which the vehicle is to stop for delivery of an item of cargo,
fuel data that identifies an amount of available fuel of the vehicle, and
an identifier of the organization;
receiving, by the route management platform and based on the identifier, route restriction data that identifies route restrictions that are to be considered when generating the set of navigational instructions,
wherein the route restrictions include a set of one or more waypoints that the vehicle is required to travel through based on a preference of the organization;
selecting, by the route management platform and based on analyzing the route restriction data, the set of one or more waypoints;
determining, by the route management platform, an initial route through an initial set of stops that includes the set of operational stops and the set of one or more waypoints;
obtaining, by the route management platform and based on the identifier, fuel selection data that is to be used to identify a set of fuel stops;
identifying, by the route management platform, a subset of fuel stops, of the set of fuel stops, that are within a threshold distance of the initial route;
obtaining, based on identifying the subset of fuel stops, at least one of:
fuel cost data that identifies a cost of fuel at the subset of fuel stops,
weather data that identifies a weather forecast for areas that are near the subset of fuel stops, or
traffic data that identifies traffic within a threshold distance of the subset of fuel stops;
selecting, by the route management platform and via a machine learning model, one or more fuel stops, of the subset of fuel stops,
wherein the one or more fuel stops are selected based on inputting to the machine learning model:
the fuel data, and
the at least one of the fuel cost data, the weather data, or the traffic data;
determining, by the route management platform, the set of navigational instructions of an updated route that includes an updated set of stops,
wherein the updated set of stops include:
the set of operational stops,
the set of one or more waypoints, and
the one or more fuel stops; and
providing, by the route management platform and to the user device, the updated route to permit the vehicle to be navigated based on the updated route.

2. The method of claim 1, wherein the updated route includes the one or more fuel stops while remaining in compliance with the route restrictions that require the vehicle to travel through the set of one or more waypoints.

3. The method of claim 1, wherein the route restrictions, that include the set of one or more waypoints, also include a set of route restriction origin areas and a set of route restriction destination areas; and
wherein the method further comprises:
determining, before selecting the set of one or more waypoints, a set of legs that are based on a start location and the set of operational stops;
determining a set of leg origin areas and a set of leg destination areas for the set of legs;
determining that a particular leg origin area, of the set of leg origin areas, is located within a particular route restriction origin area of the set of route restriction origin areas;
determining that a particular leg destination area, of the set of leg destination areas, is located within a particular route restriction destination area of the set of route restriction destination areas,
wherein the particular route restriction origin area and the particular route restriction destination area are part of the route restrictions that include the set of one or more waypoints; and
wherein selecting the set of one or more waypoints comprises:
selecting a waypoint, as part of the set of one or more waypoints, based on determining that the particular leg origin area is located within the particular route restriction origin area and based on determining that the particular leg destination area is located within the particular route restriction destination area.

4. The method of claim 1, wherein the method further comprises:
  determining a set of legs of the initial route based on a start location of the vehicle and the set of operational stops identified in the request; and
  wherein selecting the set of one or more waypoints comprises:
    selecting a waypoint, of the set of one or more waypoints, based on at least a part of a geographic area of a leg, of the set of legs, being included in a geographic area of the waypoint.

5. The method of claim 1, further comprising:
  determining, before selecting the set of one or more waypoints, a set of legs of the initial route,
    wherein the set of legs are determined based on a start location and the set of operational stops identified in the request; and
  wherein identifying the subset of fuel stops comprises:
    identifying, for a leg of the set of legs, the subset of fuel stops that are within a particular threshold distance of the leg.

6. The method of claim 1, further comprising:
  removing the set of one or more waypoints from the set of updated stops of the updated route; and
  providing a final route to the user device in a manner that causes the final route to traverse through a set of final stops without the set of one or more waypoints.

7. The method of claim 1, further comprising:
  receiving, while the vehicle is traveling along the updated route, new fuel selection data that is to be used to identify an updated set of fuel stops;
  determining, based on the new fuel selection data, a new route through one or more remaining stops of the set of operational stops;
  identifying a subset of the updated set of fuel stops that are within a threshold distance of the new route;
  selecting one or more of the subset of the updated set of fuel stops;
  determining a final route that includes an updated set of navigational instructions for the vehicle,
    wherein the final route includes the one or more of the subset of the updated set of fuel stops as part of the one or more remaining stops; and
  providing the user device with the final route.

8. A route management platform, comprising:
  one or more memories, and
  one or more processors, operatively coupled to the one or more memories, to:
    receive, from a user device, a request for a set of navigational instructions for a vehicle associated with the user device,
      wherein the vehicle is associated with an organization, and
      wherein the request includes:
        stop data that identifies a set of operational stops for the vehicle,
          wherein one or more stops of the set of operational stops is a delivery stop at which the vehicle is to stop for delivery of an item of cargo,
        fuel data that identifies an amount of available fuel of the vehicle, and
        an identifier of the organization;
    receive, based on the identifier, route restriction data that identifies route restrictions that are to be considered when generating the set of navigational instructions,
      wherein the route restrictions include a set of one or more waypoints that the vehicle is required to travel through based on a preference of the organization;
    select, based on analyzing the route restriction data, the set of one or more waypoints;
    determine an initial route through an initial set of stops that include the set of operational stops and the set of one or more waypoints;
    obtain, based on the identifier, fuel selection data that is to be used to identify a set of fuel stops;
    identify a subset of fuel stops, of the set of fuel stops, that are within a threshold distance of the initial route;
    obtain, based on identifying the subset of fuel stops, at least one of:
      fuel cost data that identifies a cost of fuel at the subset of fuel stops,
      weather data that identifies a weather forecast for areas that are near the subset of fuel stops, or
      traffic data that identifies traffic within a threshold distance of the subset of fuel stops;
    select, via a machine learning model, one or more fuel stops, of the subset of fuel stops,
      wherein the one or more fuel stops are selected based on inputting to the machine learning model:
        the fuel data, and
        the at least one of the fuel cost data, the weather data, or the traffic data;
    determine the set of navigational instructions of an updated route that includes an updated set of stops,
      wherein the updated set of stops include:
        the set of operational stops,
        the set of one or more waypoints, and
        the one or more fuel stops; and
    provide, to the user device, the updated route to permit the vehicle to be navigated based on the updated route.

9. The route management platform of claim 8, wherein the updated route includes the one or more fuel stops while remaining in compliance with the route restrictions that require the vehicle to travel through the set of one or more waypoints.

10. The route management platform of claim 8, wherein the route restrictions, that include the set of one or more waypoints, also include a set of route restriction origin areas and a set of route restriction destination areas; and
  wherein the one or more processors are further to:
    determine, before selecting the set of one or more waypoints, a set of legs that are based on a start location and the set of operational stops;
    determine a set of leg origin areas and a set of leg destination areas for the set of legs;
    determine that a particular leg origin area, of the set of leg origin areas, is located within a particular route restriction origin area of the set of route restriction origin areas;
    determine that a particular leg destination area, of the set of leg destination areas, is located within a particular route restriction destination area of the set of route restriction destination areas,
      wherein the particular route restriction origin area and the particular route restriction destination area are part of the route restrictions that include the set of one or more waypoints; and
    wherein selecting the set of one or more waypoints comprises:

selecting a waypoint, as part of the set of one or more waypoints, based on determining that the particular leg origin area is located within the particular route restriction origin area and based on determining that the particular leg destination area is located within the particular route restriction destination area.

11. The route management platform of claim 8, wherein the one or more processors are further to:
determine a set of legs of the initial route based on a start location of the vehicle and the set of operational stops identified in the request; and
wherein the one or more processors, when selecting the set of one or more waypoints, are to:
select a waypoint, of the set of one or more waypoints, based on at least a part of a geographic area of a leg, of the set of legs, being included in a geographic area of the waypoint.

12. The route management platform of claim 8, wherein the one or more processors are further to:
determine, before selecting the set of one or more waypoints, a set of legs of the initial route,
wherein the set of legs are determined based on a start location and the set of operational stops identified in the request; and
wherein the one or more processors, when identifying the subset of fuel stops, are to:
identify, for a leg of the set of legs, the subset of fuel stops that are within a particular threshold distance of the leg.

13. The route management platform of claim 8, wherein the one or more processors are further to:
remove the set of one or more waypoints from the updated set of stops of the updated route; and
provide a final route to the user device in a manner that causes the final route to traverse through a set of final stops without the set of one or more waypoints.

14. The route management platform of claim 8, wherein the one or more processors are further to:
receive, while the vehicle is traveling along the updated route, new fuel selection data that is to be used to identify an updated set of fuel stops;
determine, based on the new fuel selection data, a new route through one or more remaining stops of the set of operational stops;
identify a subset of the updated set of fuel stops that are within a threshold distance of the new route;
select one or more of the subset of the updated set of fuel stops to include as part of the one or more remaining stops;
determine a final route that includes an updated set of navigational instructions for the vehicle,
wherein the final route includes the one or more of the subset of the updated set of fuel stops as part of the one or more remaining stops; and
provide the user device with the final route.

15. A non-transitory computer-readable medium storing instructions, the instructions comprising:
one or more instructions that, when executed by one or more processors of a route management platform, cause the one or more processors to:
receive, from a user device, a request for a set of navigational instructions for a vehicle associated with the user device,
wherein the vehicle is associated with an organization, and
wherein the request includes:
stops data that identifies a set of operational stops for the vehicle,
wherein one or more stops of the set of operational stops is a delivery stop at which the vehicle is to stop for delivery of an item of cargo,
fuel data that identifies an amount of available fuel within the vehicle, and
an identifier of the organization;
receive, based on the identifier, route restriction data that identifies route restrictions that are to be considered when generating the set of navigational instructions,
wherein the route restrictions include a set of one or more waypoints that the vehicle is required to travel through based on a preference of the organization;
select, based on analyzing the route restriction data, the set of one or more waypoints;
determine an initial route through an initial set of stops that includes the set of operational stops and the set of one or more waypoints;
obtain, based on the identifier, fuel selection data that is to be used to identify a set of fuel stops;
identify a subset of fuel stops, of the set of fuel stops, that are within a threshold distance of the initial route;
obtain, based on identifying the subset of fuel stops, at least one of:
fuel cost data that identifies a cost of fuel at the subset of fuel stops,
weather data that identifies a weather forecast for areas that are near the subset of fuel stops, or
traffic data that identifies traffic within a threshold distance of the subset of fuel stops,
select, via a machine learning model, one or more fuel stops, of the subset of fuel stops,
wherein the one or more fuel stops are selected based on inputting to the machine learning model:
the fuel data, and
the at least one of the fuel cost data, the weather data, and the traffic data;
determine the set of navigational instructions of an updated route that includes an updated set of stops,
wherein the updated set of stops include:
the set of operational stops,
the set of one or more waypoints, and
the one or more fuel stops; and
provide, to the user device, the updated route to permit the vehicle to be navigated based on the updated route.

16. The non-transitory computer-readable medium of claim 15, wherein the route restrictions, that include the set of one or more waypoints, also include a set of route restriction origin areas and a set of route restriction destination areas; and
wherein the one or more instructions, when executed by the one or more processors, further cause the one or more processors to:
determine, before selecting the set of one or more waypoints, a set of legs that are based on a start location and the set of operational stops;
determine a set of leg origin areas and a set of leg destination areas for the set of legs;

determine that a particular leg origin area, of the set of leg origin areas, is located within a particular route restriction origin area of the set of route restriction origin areas;

determine that a particular leg destination area, of the set of leg destination areas, is located within a particular route restriction destination area of the set of route restriction destination areas, wherein the particular route restriction origin area and the particular route restriction destination area are part of the route restrictions that include the set of one or more waypoints; and wherein the one or more instructions, that cause the one or more processors to select the set of one or more waypoints, cause the one or more processors to:

select a waypoint, as part of the set of one or more waypoints, based on determining that the particular leg origin area is located within the particular route restriction origin area and based on determining that the particular leg destination area is located within the particular route restriction destination area.

17. The non-transitory computer-readable medium of claim 15, wherein the updated route includes the one or more fuel stops while remaining in compliance with the route restrictions that require the vehicle to travel through the set of one or more waypoints.

18. The non-transitory computer-readable medium of claim 15, wherein the one or more instructions, when executed by the one or more processors, further cause the one or more processors to:

determine, before selecting the set of one or more waypoints, a set of legs of the initial route, wherein the set of legs are determined based on a start location and the set of operational stops identified in the request; and wherein the one or more instructions, that cause the one or more processors to identify the subset of fuel stops, cause the one or more processors to:

identify, for a leg of the set of legs, one or more fuel stops that are within a particular threshold distance of the leg.

19. The non-transitory computer-readable medium of claim 15, wherein the one or more instructions, when executed by the one or more processors, further cause the one or more processors to:

remove the set of one or more waypoints from the updated set of stops of the updated route; and provide a final route to the user device in a manner that causes the final route to traverse through a final set of stops without the set of one or more waypoints.

20. The non-transitory computer-readable medium of claim 15, wherein the one or more instructions, when executed by the one or more processors, further cause the one or more processors to:

receive, while the vehicle is traveling along the updated route, new fuel selection data that is to be used to identify an updated set of fuel stops;

determine, based on the new fuel selection data, a new route through one or more remaining stops of the set of operational stops;

identify a subset of the updated set of fuel stops that are within a threshold distance of the new route;

select one or more of the subset of the updated set of fuel stops to include as part of the one or more remaining stops;

determine a final route that includes an updated set of navigational instructions for the vehicle, wherein the final route includes the one or more of the subset of the updated set of fuel stops as part of the one or more remaining stops; and provide the user device with the final route.

* * * * *